Patented May 8, 1951

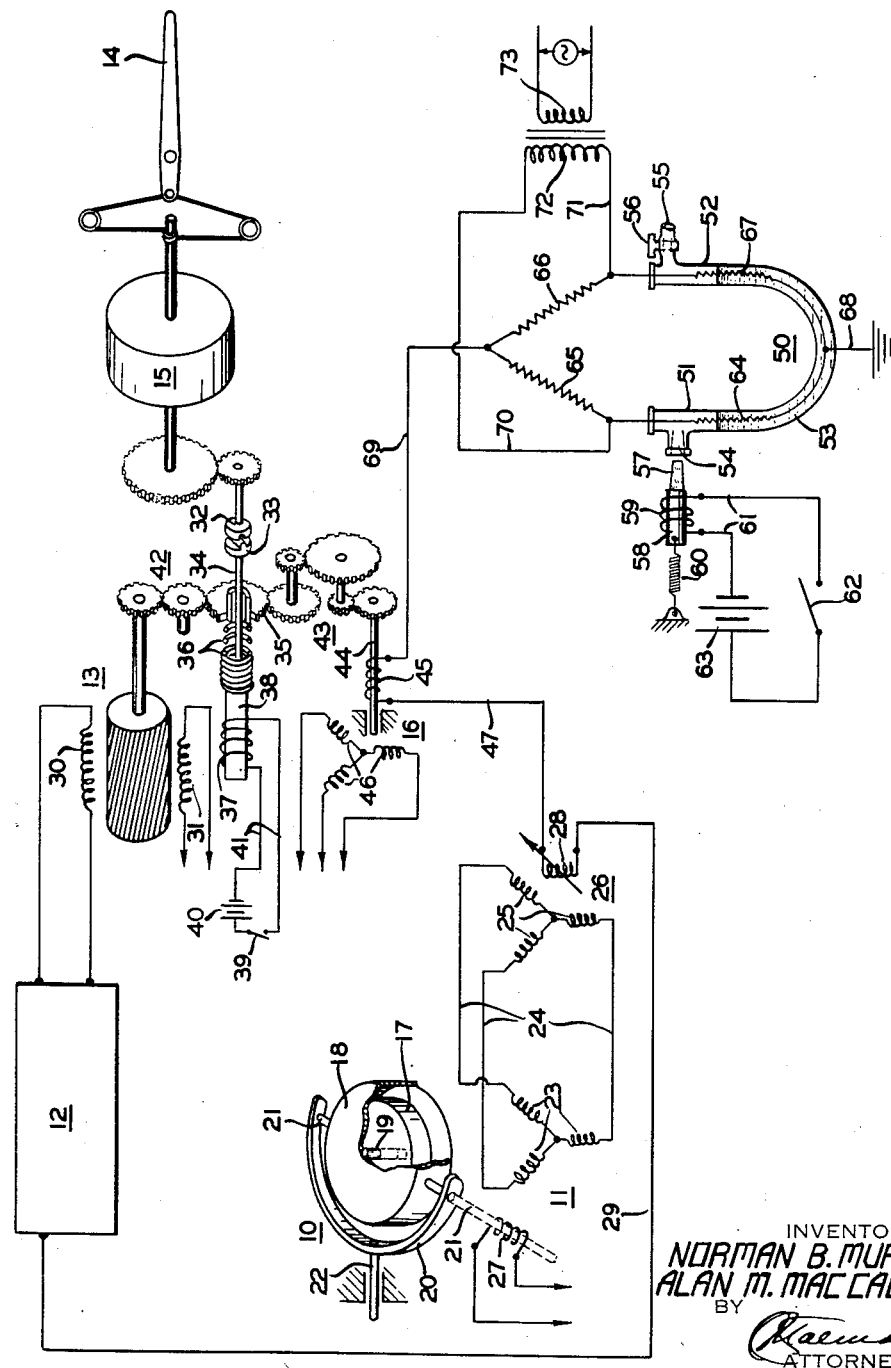

2,552,196

UNITED STATES PATENT OFFICE 2,552,196

ALTITUDE CONTROL

Alan M. MacCallum, Maywood, and Norman B. Murphy, West Englewood, N. J., assignors to Bendix Aviation Corporation, Teterboro, N. J., a corporation of Delaware Application April 8, 1946, Serial No. 660,340

8 Claims. (Cl. 244—77)

This invention relates generally to automatic steering systems for mobile craft such as aircraft, for example, and more particularly to altitude control means therefor whereby the craft, upon attaining a desired altitude, will be maintained in that altitude.

In automatic steering systems of this general character, level flight is maintained by usually controlling elevator surfaces from a pitch take-off located at a gyro horizon, the take-off responding to a nose-up or nose-down condition to bring the craft to the desired level attitude. Although the gyro horizon and its pitch take-off are effective to control level craft flight they are not able to maintain the craft at a desired altitude. For example, upon encountering rising or descending air currents, the craft will rise or descend without a change in the relation between its longitudinal or fore and aft axis and the plane of level flight so that, in the absence of a change in the position of the fore and aft axis, the gyro pitch take-off will provide no control on the elevator.

In an effort to overcome the foregoing disadvantage and to maintain the craft in a level flight and in a desired altitude, various expedients have been proposed heretofore responsive to atmospheric pressure changes for supplementing gyro control to actuate elevator and, therefore, maintain craft flight at a desired altitude. These provisions have been complicated, however, generally utilizing one pressure sensitive member for actuating other pressure sensitive members to impart a control function on the elevator.

It is an object of the present invention, therefore, to provide a novel, simple and desirable altitude control expedient for maintaining craft flight at a desired altitude nothwithstanding rising or descending air currents, changes in loading of the craft, etc.

Another object of the present invention is to provide a novel automatic steering system for mobile craft, whereby the craft will be automatically maintained in a desired attitude and altitude.

A further object is to provide a novel electric altitude control unit for aircraft whereby the craft will be maintained in a desired altitude of flight.

Another and further object is to provide a novel supplementary control for an automatic steering system for mobile craft whereby the control effected by the attitude control means is supplemented to provide a desired altitude control as well.

The above and further objects and novel features of the invention will appear more fully from the following detailed description when the same is read in connection with the accompanying drawing. It is to be expressly understood, however, that the drawing is for the purpose of illustration only and is not intended as a definition of the limits of the invention.

The single figure of the drawing is a diagrammatic illustration of the attitude control portion of an automatic steering system embodying the novel altitude control arrangement of the present invention.

The automatic steering system hereof may be generally similar to that fully described and claimed in copending application Serial No. 516,488 filed December 31, 1943, and for an understanding of the present invention only the pitch control channel thereof has been here shown which comprises an artificial or gyro horizon 10 provided with an electrical take-off 11 connected with the input of a conventional vacuum tube amplifier 12, the output of which, in turn, energizes a two phase induction motor 13 for actuating an elevator surface 14 through a speed reduction gearing contained within a housing 15. In operating, motor 13 likewise actuates an electrical follow-up device 16 which develops a follow-up signal impressed upon the pitch signal for modifying motor operation.

Horizon gyro 10 comprises a rotor 17 mounted within a rotor case 18 for spinning about a normally vertical spin axis 19, any desired erecting mechanism being provided to maintain the spin axis substantially vertical. Rotor case 18 supports the rotor for oscillation about a first horizontal axis by its mounting within a gimbal ring 20 by way of inner trunnions 21, the rotor being further supported for oscillation about a second horizontal axis perpendicular to the first horizontal axis by reason of the gimbal being mounted by way of an outer trunnion 22 which is journalled on the craft, provided with the automatic steering arrangement hereof, or within an instrument case secured to the craft. The axis defined by the outer trunnion 22 thus constitutes the craft bank axis while the transverse axis constituted by the inner trunnions defines the craft pitch axis.

Pitch take-off 11 comprises a transmitter which constitutes a three phase wound stator 23 which is connected by way of conductors 24 with a similar and remotely located three phase wound stator 25 of a pitch repeater device 26. Inductively coupled with stator 23 is a wound rotor 27 supported by one of inner trunnions 21 of the horizon gyro and energized from a suitable source of alternating current (not shown). Also inductively coupled with stator 25 is a wound rotor 28, one side of which connects by way of a lead 29 with the input of amplifier 12.

Normally, both wound rotors 27 and 28 are synchronously positioned and rotor 28 is at its electrical null, i. e., a position in which its electrical axis is normal to the resultant of the magnetic field at stator 25 so that no signal appears within rotor 28 even though current does flow in rotor 27. As soon, however, as relative displacement occurs between the horizon gyro and the craft's fore and aft axis, relative motion also occurs between stator 23 and its rotor so that varying voltages are induced within the windings of stator 23 which are communicated to the windings of stator 25. The resultant magnetic field at stator 25 is thus displaced angularly and rotor 28, no longer being normal to the new resultant field has a signal induced therein which is communicated to the amplifier and fed therefrom to energize the variable phase 30 of motor 13, the second phase 31 of which is constantly energized from a suitable source of alternating current (not shown).

Motor 13 drives elevator surface 14 through a servo clutch comprising two co-engaging faces 32 and 33, the former connecting through speed reduction gearing 15 with the elevator surface and the latter being supported by a shaft 34 within a hollow gear 35 which fixedly mounts clutch face 33 for rotation therewith but permits slidable or reciprocal motion thereof relative thereto for clutch engagement or disengagement. An extension of shaft 34 is provided with an enlarged end for retaining one end of a coil spring 36 therein, the opposite end of which abuts gear 35. Normally, spring 36 urges clutch face 33 out of engagement with clutch face 32.

For engaging the clutch and thereby defining a drivable connection between motor 13 and surface 14, a solenoid 37 is provided having a plunger 38 abutting the free end of shaft 34. Solenoid 37 is connected through a switch 39 with a battery 40 by way of leads 41 so that by closing the switch, the solenoid is energized and the plunger ejected therefrom to provide clutch engagement.

The motor, in driving clutch face 33 through a gear system 42 meshing with gear 35, also drives, through a speed reduction gear system 43, a shaft 44 carrying a wound rotor 45 thereon which is inductively coupled with a three phase wound stator 46 of electrical follow-up device 16. In this case, stator 46 is energized from a suitable source of alternating current (not shown) and normally rests in an electrical null position, i. e., one in which the electrical axis of the rotor is normal to the resultant magnetic field of stator 46. Motion of rotor 45 from it null develops a follow-up signal therein which is communicated to amplifier 12 to be there superimposed upon the pitch displacement channel, one end of the rotor being connected to the free end of wound rotor 28 by way of a lead 47 for this purpose.

With the development of a craft pitch condition, a signal proportional to the displacement of the craft fore and aft axis relative to level flight is developed within wound rotor 28 to energize motor 13 which, assuming clutch switch 39 to be closed, deflects elevator surface 14 to start returning the craft to level flight. With the operation of motor 13, rotor winding 45 of device 16 is displaced angularly whereby a follow-up signal is induced therein to be impressed on the displacement signal. As more fully described in the aforementioned copending application, the follow-up signal builds up until it is equal and opposite to the pitch signal whereupon motor 13 is de-energized at which time elevator 14 has assumed a given deflected position. As the craft returns to its level attitude, the pitch signal diminishes within rotor 28 and the follow-up signal predominates to reverse motor 13 until the elevator surface again assumes a neutral position at which time rotor winding 45 is returned to its null position and the follow-up signal drops to zero and, since the desired condition between rotor 27 and stator 23 of take-off 11 is re-established, the signal within rotor winding 28 also drops to zero.

Although the system thus far described is well adapted for maintaining the craft in level flight it is not capable of maintaining level flight at a desired altitude level, it being well known that the craft is subject to changes in altitude level of such a character that no relative motion occurs between the gyro horizon and its pitch take-off. To overcome this defect and to provide a steering system whereby a given altitude level will be automatically maintained at all times, the novel arrangement hereof is provided.

Coming now to the novel altitude control expedient of the present invention, it is shown as comprising a U-tube 50 having two parallel spaced columns 51 and 52 joined at their base. The tube is provided with mercury 53 therein and each of the columns has an opening 54 and 55 whereby the space above the mercury levels is normally in communication with atmospheric pressure. Opening 55 may be provided with a stop-cock 56 therein which is normally open to permit communication of column 52 with the atmosphere while opening 54, on the other hand, is normally open but is adapted for closing under conditions to be hereinafter described. The means for closing opening 54 is constituted by a suitable stopper 57 carried by a plunger 58 of a solenoid 59, the plunger being normally held by way of a spring 60 in the open position shown in the drawing. Solenoid coil 59 connects through leads 61 and a switch 62 with a battery 63. Closing of switch 62 urges plunger 58 outwardly against the constraint of spring 60 to force stopper 57 into opening 54 and thereby close communication between atmosphere and column 51.

A Wheatstone bridge circuit is provided having equal resistor arms 64, 65, 66 and 67, two adjoining arms 64 and 67 of which are immersed within the mercury of columns 51 and 52 and their juncture point at the base of tube 50 is grounded by way of a lead 68. The opposite point of the bridge, i. e., that defined by the juncture point of arms 65 and 66 is connected by way of a lead 69 in series with rotor 45 of follow-up device 16, rotor 28 of pitch repeater device 26 and the input of amplifier 12. The remaining bridge diagonal is connected by way of conductors 70 and 71 with a secondary winding 72 of a transformer whose primary winding 73 is connected across a suitable source of alternating current.

Under normal conditions and with atmospheric pressure communicated to both columns in the space above the mercury, the mercury levels will be the same thereby providing similar resistance values for arms 64 and 67 of the bridge so that the bridge is electrically balanced. Although arms 64 and 67 have been shown in the form of resistors they may be in the form of a center tapped conductor having a high resistance value. As soon as the mercury levels change, i. e., the level within column 51 rises and that within column 52 is lowered, the resistance of arm 67 is decreased and that of arm 64 is increased so that the bridge circuit is unbalanced and current flows in one direction in conductor 69 to the amplifier while with a rise in the level of the mercury within column 52 and a lowering in the level of the mercury within column 51, the resistance of arm 64 is decreased and that of arm 67 increased to unbalance the bridge circuit to provide current flow in an opposite direction in conductor 69.

In operation, the craft is flown to a desired altitude with both columns 51 and 52 of the novel altitude control unit hereof communicating with atmospheric pressure so that the bridge circuit is balanced. Proper controls are thereafter actuated to level off the craft and if it is desired to maintain craft flight in that altitude, switch 62 is closed whereupon the solenoid 59 is energized to eject plunger 58 and thereby close opening 54 of column 51 so that the pressure in the latter column remains the same thereafter so long as opening 54 remains closed. Since column 52 is open to atmosphere, any change in altitude flight wherein the craft's fore and aft axis has not been altered relative to a plane of level flight manifests itself in an unbalance of the bridge circuit to provide a control signal to the elevator to return the craft to its prescribed flight altitude.

For example, as a result of up-drafts, the craft altitude may be increased from that prescribed so that the pressure within column 52 drops. Inasmuch as the pressure above the mercury level within column 51 will be greater at this point, the mercury level within the latter column will be lowered increasing the impedance of arm 64 while the level of the mercury within column 52 will rise to decrease the impedance of arm 67. The bridge circuit is thereby unbalanced to provide a signal to develop down-elevator to return the craft to its prescribed altitude which, when attained, results in a levelling off of the elevator by follow-up device 16 while the pressure within column 52 becomes equal to that in column 51 so that both mercury levels become the same to rebalance the bridge circuit.

As the craft returns to its prescribed altitude as a result of the bridge signal, relative displacement occurs between stator 23 and rotor 27 of take-off device 11 to develop a signal in repeater rotor 28 to level off the elevator. If this occurs and the desired altitude has not been attained, a control signal will still be available at the bridge circuit to actuate elevator until the desired altitude is achieved. The take-off signal and the bridge signal actually provide an average displacement signal on the elevator so that the craft is returned to and maintained in the desired altitude.

Assuming loss of altitude as a result of a downdraft, the reverse operation takes place, i. e., the pressure above the mercury level in column 52 rises and exceeds the pressure above the mercury level in column 51 so that the level rises in the latter column to lower the impedance of arm 64 and lowers in column 52 to increase the impedance of arm 67. The bridge circuit is thus unbalanced to provide a reverse signal for developing up-elevator to return the craft to its prescribed altitude.

As will now be apparent to those skilled in the art, a novel and simple altitude control unit has been provided for use in an automatic steering system to supplement the normal pitch control thereof whereby a craft may be maintained not only in a desired level attitude but will be also automatically maintained at a desired altitude level.

Although only a single embodiment of the present invention has been illustrated and described in detail, it is to be expressly understood that the invention is not limited thereto. Various changes can be made in the design and arrangement of the parts without departing from the spirit and scope of the invention as will now be understood by those skilled in the art. For a definition of the limits of the invention, reference will be had primarily to the appended claims.

We claim:

1. An automatic altitude controller for maintaining an aircraft in a desired flight altitude level once such level has been attained, comprising a container provided with two ends normally open to atmosphere, a movable pressure responsive expedient in said container, means for closing one end of said container from the atmosphere when the desired flight altitude level has been attained whereby said pressure responsive expedient is moved in response to a change in atmospheric pressure communicated to the other end of said container, such pressure change occurring in response to craft departure from the desired flight altitude level, and an electrical device operatively associated with said pressure responsive expedient for producing a control signal in response to movement of said pressure responsive expedient.

2. An automatic altitude controller for maintaining an aircraft in a desired flight altitude level once such level has been attained, comprising a container provided with two ends normally open to atmosphere, a movable pressure responsive expedient in said container, means for closing one end of said container from the atmosphere when the desired flight altitude level has been attained whereby said pressure responsive expedient is moved in response to a change in atmospheric pressure communicated to the other end of said container, such pressure change occurring in response to craft departure from the desired flight altitude level, and a normally balanced electrical circuit operatively associated with said pressure responsive expedient and unbalanced thereby to provide a control signal in response to movement of said pressure responsive expedient.

3. An automatic altitude controller for maintaining an aircraft in a desired flight altitude level once such level has been attained, comprising a substantially U-shaped container normally exposed at both of its ends to atmosphere, liquid means in said container, means for closing one end of said container from the atmosphere whereby said liquid is moved in said container in response to a change in atmospheric pressure communicated to the other side of said container, and means comprising an electrical impedance immersed in said liquid whereby in response to movement of the latter the impedance of the former is changed.

4. An automatic altitude controller for maintaining an aircraft in a desired flight altitude level once such level has been attained, comprising a tube having a pair of interconnected columns with both columns normally exposed to atmosphere, a metallic liquid in said tube whose level is normally the same in both columns, means for closing one column from the atmosphere whereby said liquid is moved in said tube in response to a change in atmospheric pressure communicated to the other of said columns, and means comprising an electrical impedance immersed in said liquid whereby in response to movement of the latter the impedance of the former is changed.

5. An automatic altitude controller for maintaining an aircraft in a desired flight altitude level once such level has been attained, comprising a container provided with two ends normally open to atmosphere, a movable metallic mass within said container, means for closing one end of said container from the atmosphere whereby said metallic mass is moved within said container in response to a change in atmospheric pressure communicated to the other end of said container, and an electrical device operatively associated with said metallic mass for producing a control signal in response to movement of said mass.

6. Altitude control means for maintaining an aircraft having a movable elevator surface thereon together with a servomotor for operating said surface in a desired flight altitude level once such level has been attained, comprising a container provided with a pair of openings normally communicating the container with the atmosphere, movably arranged pressure actuated means within said container intermediate said openings, means for closing one opening of said container from the atmosphere when the desired flight altitude level has been attained so that the pressure thereafter affecting one side of the pressure actuated means remains substantially the same as that acting thereon immediately preceding the closing off of said one container opening from atmosphere, electrical means associated with said pressure actuated means and energized in response to movement of the latter due to a change in atmospheric pressure communicated to the other opening of said container when said first opening is closed from atmosphere for developing an elevator displacement signal, such atmospheric pressure change occurring as a result of a departure by the craft from the prescribed flight altitude level and causing movement of said pressure actuated means, means communicating said signal to said motor for displacing said elevator to return the craft to the prescribed flight altitude level, and electrical means responsive to operation of said motor for generating an electrical follow-up signal to mix with said displacement signal whereby said elevator is substantially centered when the craft returns to its prescribed flight altitude level.

7. Altitude control means for maintaining an aircraft having a movable elevator surface thereon together with a servomotor for operating said surface in a desired flight altitude level once such level has been attained, comprising a container provided with two ends normally open to atmosphere, movably arranged pressure actuated means within said container intermediate said ends, means for closing one end of said container from the atmosphere when the desired flight altitude level has been attained so that the pressure thereafter affecting one side of the pressure actuated means remains substantially the same as that acting thereon immediately preceding the closing off of said one container end from atmosphere, electrical means associated with said pressure actuated means and energized in response to a movement of said pressure actuated means due to a change in atmospheric pressure communicated to the other end of said container when said first end is closed from atmosphere for developing an elevator displacement signal, such atmospheric pressure change occurring as a result of a departure by the craft from the prescribed flight altitude level and causing movement of said pressure actuated means, means communicating said signal to said motor for displacing said elevator to return the craft to the prescribed flight altitude level, electrical means responsive to operation of said motor for generating an electrical follow-up signal to mix with said displacement signal whereby said elevator is substantially centered when the craft returns to its prescribed flight altitude level, and means for interconnecting said elevator signal developing means and said follow-up signal generating means in series.

8. In an automatic pilot for aircraft having a movable elevator surface thereon, means for controlling said elevator to maintain a predetermined flight level comprising a container having two openings communicating it with the atmosphere, movably arranged pressure actuated means within said container intermediate said openings, means for closing one opening of said container from the atmosphere so that the pressure thereafter affecting one side of said pressure actuated means remains substantially the same as that acting thereon immediately preceding the closing off of said one opening from atmosphere, and variable impedance means associated with said pressure actuated means whose impedance is varied in response to movement of said pressure actuated means as a result of a change in the atmospheric pressure communicated to the other opening of said container when said first opening is closed from said atmosphere to develop an electrical signal for controlling said elevator.

ALAN M. MacCALLUM.
NORMAN B. MURPHY.

REFERENCES CITED

The following references are of record in the file of this patent:

UNITED STATES PATENTS

| Number | Name | Date |
| --- | --- | --- |
| 1,019,616 | Eilertsen | Mar. 5, 1912 |
| 1,719,067 | Martin | July 2, 1929 |
| 1,994,757 | De Florez et al. | Mar. 19, 1935 |
| 2,091,300 | Bassett et al. | Aug. 31, 1937 |
| 2,091,306 | Carlson | Aug. 31, 1937 |
| 2,249,738 | Brownfield | July 22, 1941 |
| 2,357,745 | Kliever | Sept. 5, 1944 |
| 2,358,803 | Hanson et al. | Sept. 26, 1944 |
| 2,398,372 | Green | Apr. 16, 1946 |
| 2,415,429 | Kellogg et al. | Feb. 11, 1947 |

FOREIGN PATENTS

| Number | Country | Date |
| --- | --- | --- |
| 44,926 | Netherlands | Aug. 15, 1938 |
| 135,332 | Sweden | Sept. 15, 1929 |